(12) United States Patent
Nakazato

(10) Patent No.: US 10,935,915 B2
(45) Date of Patent: Mar. 2, 2021

(54) IMAGE FORMING APPARATUS HAVING TEST PATTERNS FOR IMAGE DENSITY ADJUSTMENT

(71) Applicant: CANON KABUSHIKI KAISHA, Tokyo (JP)

(72) Inventor: Jun Nakazato, Noda (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/698,340

(22) Filed: Nov. 27, 2019

(65) Prior Publication Data
US 2020/0183313 A1    Jun. 11, 2020

(30) Foreign Application Priority Data
Dec. 6, 2018   (JP) .............................. JP2018-229206

(51) Int. Cl.
*G03G 15/00*   (2006.01)
*G06F 3/12*   (2006.01)

(52) U.S. Cl.
CPC ..... *G03G 15/5041* (2013.01); *G03G 15/5025* (2013.01); *G06F 3/1256* (2013.01)

(58) Field of Classification Search
CPC ....................... G03G 15/5058; G03G 15/5062
See application file for complete search history.

(56) References Cited

U.S. PATENT DOCUMENTS

2020/0333723 A1*  10/2020  Horiuchi .............. G03G 15/043

FOREIGN PATENT DOCUMENTS

| JP | 2002-049189 A |   | 2/2002 |   |
|----|---------------|---|--------|---|
| JP | 2010134178 A  | * | 6/2010 |   |
| JP | 2011145596 A  | * | 7/2011 | ......... H04N 1/00031 |

OTHER PUBLICATIONS

Machine translation of Nishikino, JP 2002-049189.*

* cited by examiner

*Primary Examiner* — Sevan A Aydin
(74) *Attorney, Agent, or Firm* — Canon U.S.A., Inc IP Division

(57) ABSTRACT

An image forming apparatus controls a first image forming unit and a second image forming unit to form a plurality of pattern images. The plurality of pattern images includes a first pattern image formed by the first image forming unit, a second pattern image formed by the second image forming unit, a plurality of third pattern images that are formed by the first image forming unit and have different tones from one another, and a plurality of fourth pattern images that are formed by the second image forming unit and have different tones from one another. The image forming apparatus obtains data that has been output from a sensor and is related to the plurality of pattern images, and generates the conversion condition based on the data.

11 Claims, 5 Drawing Sheets

IMAGE FORMING APPARATUS HAVING TEST PATTERNS FOR IMAGE DENSITY ADJUSTMENT

BACKGROUND

Field

One disclosed aspect of the embodiments relates to an image forming apparatus.

Description of the Related Art

As the characteristics of an exposure unit included in an electrophotographic apparatus, such as a printer and a copier, it is desirable to irradiate the surface of a photosensitive member with a uniform light amount, provided that image information is the same. However, the light amount becomes uneven depending on tolerances for components of a light collecting lens and tolerances for assembling of the exposure unit. Such unevenness in the light amount represents uneven image density, and is hence the cause of reduction in the image quality. There are factors other than the exposure unit; although it is ideal that the photosensitive member and a development roller are in a relatively parallel positional relationship with each other in the electrophotographic apparatus, if the photosensitive member and the development roller become tilted from the ideal parallel state due to, for example, the assembling tolerances, the distance between the photosensitive member and the development roller will vary in a longitudinal direction. In this case, a developed toner amount is not the same in a main-scanning direction, and thus the uniformity in density is lowered.

Japanese Patent Laid-Open No. 2002-49189 suggests a method for correcting such uneven image density. Japanese Patent Laid-Open No. 2002-49189 uses a test chart having formed thereon density patterns that have the same density in a main-scanning direction and multiple, stepwise tones in a sub-scanning direction. The test chart is read by a reader or the like, and using the density at a central position of an image in the main-scanning direction as a reference density, the image density at an arbitrary position in the main-scanning direction is compared with the reference density, and a writing light amount of an exposure unit is corrected so that the image density matches the reference density.

However, with the method of Japanese Patent Laid-Open No. 2002-49189, as the central position of the image in the main-scanning direction is used as the reference density, there is a risk that erroneous correction may be made when, for example, an image defect has occurred at the central position. Furthermore, as the density patterns that vary in density in a stepwise manner in the sub-scanning direction are formed as the test chart, many image formation regions are necessary in the sub-scanning direction. Therefore, forming the patterns in all colors makes it necessary to provide the test chart on multiple, separate sheets. If this is addressed by reducing the number of sheets of the test chart through downsizing of the density patterns, there is a risk that the reading accuracy may be lowered.

SUMMARY

In view of the above, there is demand for reading stability that is not susceptible to partial image defects. Furthermore, there is demand to shorten an adjustment period by reducing the number of sheets of the test chart without drastically downsizing the density patterns.

According to one aspect of the embodiments, an image forming apparatus includes a conversion unit, a first image forming unit, a second image forming unit, a conveyance unit, a transfer unit, and a controller. The conversion unit is configured to convert image data based on a conversion condition. The first image forming unit is configured to form an image of a first color on a first photosensitive member based on the converted image data. The second image forming unit is configured to form an image of a second color on a second photosensitive member based on the converted image data. The conveyance unit is configured to convey a sheet. The transfer unit is configured to transfer the image of the first color on the first photosensitive member and the image of the second color on the second photosensitive member to the sheet. The controller is configured to control the first image forming unit and the second image forming unit to form a plurality of pattern images. The plurality of pattern images includes a first pattern image formed by the first image forming unit, a second pattern image formed by the second image forming unit, a plurality of third pattern images that are formed by the first image forming unit and have different tones from one another, and a plurality of fourth pattern images that are formed by the second image forming unit and have different tones from one another. The controller is further configured to control the transfer unit to transfer the plurality of pattern images to the sheet, to obtain data that has been output from a sensor and is related to the plurality of pattern images, and to generate the conversion condition based on the data. The first pattern image is formed so that a density thereof is a first density. The second pattern image is formed so that a density thereof is a second density. The first pattern image extends in a predetermined direction on the sheet, the predetermined direction being perpendicular to a conveyance direction in which the conveyance unit conveys the sheet. The second pattern image extends in the predetermined direction on the sheet. The plurality of third pattern images is aligned in the predetermined direction on the sheet. The plurality of fourth pattern images is aligned in the predetermined direction on the sheet.

The disclosure can improve stability when reading uneven image density, reduce the number of sheets of a test chart used in correction of the uneven image density and the tone characteristics, and shorten an adjustment period.

Further features of the disclosure will become apparent from the following description of exemplary embodiments (with reference to the attached drawings).

DESCRIPTION OF THE EMBODIMENTS

The following describes an embodiment according to the disclosure of the present application using the drawings. Note that the following embodiment is an example and is not intended to be limiting. Furthermore, although the following embodiment will be described using an image forming apparatus of an electrophotographic method as an example, the embodiment may be applied to an image forming apparatus of another method (e.g., an inkjet method) in relation to a structure of a test chart and control of density adjustment and the like.

[Overall Configuration of Image Forming Apparatus]

Figure 5:
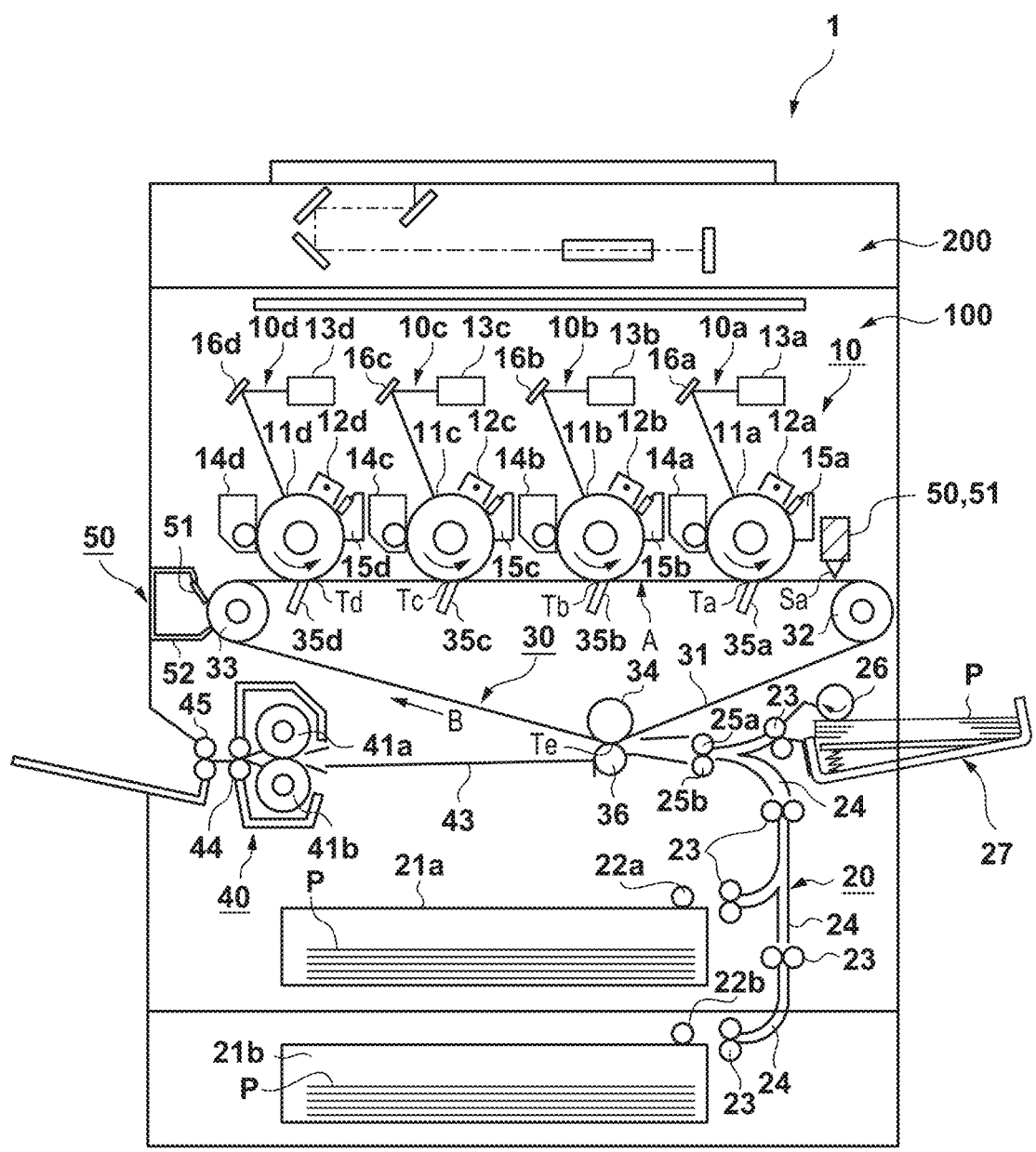
FIG. 5 is a schematic cross-sectional diagram of a configuration of an image forming apparatus according to the present embodiment.

A schematic configuration of an image forming apparatus according to the present embodiment is now described using FIG. 5. An image forming apparatus 1 according to the present embodiment is a color electrophotographic apparatus of an electrophotographic method, in which a plurality of image forming units is arranged in parallel and which uses an intermediate transfer method. The image forming apparatus 1 according to the present embodiment includes an original reading unit 200 that reads an original image, and a printer unit 100 that prints an image on paper. The printer unit 100 includes four image forming units 10 (10a, 10b, 10c, 10d) that are disposed in alignment, a paper feeding unit 20, an intermediate transfer unit 30, a fixing unit 40, and a printer control unit 500 (not shown in FIG. 5). In the following description, the explanation that is common to the identical constituent elements will be given collectively, and the identical constituent elements will be mentioned using reference signs when they need to be explained on an individual basis.

Below, each unit will be described in detail. The image forming units 10 (10a, 10b, 10c, 10d) are all configured in the same way. Here, it is assumed that the image forming units 10 respectively correspond to developing agents of different colors. Although the present embodiment is described using an example of a configuration that includes four image forming units 10 corresponding to four developing agents, the number of the image forming units may be increased or decreased. In the image forming units 10, electrophotographic photosensitive members that each have a shape of a hollow cylinder and serve as first image carriers, that is to say, photosensitive drums 11 (11a, 11b, 11c, 11d), are axially supported in a rotative manner, and are rotated and driven in the arrow direction. Primary chargers 12 (12a, 12b, 12c, 12d), optical systems 13 (13a, 13b, 13c, 13d), turning mirrors 16 (16a, 16b, 16c, 16d), developing apparatuses 14 (14a, 14b, 14c, 14d), and cleaning apparatuses 15 (15a, 15b, 15c, 15d) are disposed so as to face the outer circumferential surfaces of the photosensitive drums 11a to 11d, respectively, in the direction of rotation of the photosensitive drums.

The primary chargers 12 apply charges of a uniform charge amount to the surfaces of the photosensitive drums 11. Then, based on a signal that has been modulated in accordance with an original image signal from the original reading unit 200, the photosensitive drums 11 are exposed to laser beams emitted by the optical systems 13 via the turning mirrors 16, and consequently have electrostatic latent images formed thereon. Furthermore, the formed electrostatic latent images are visualized by the developing apparatuses 14a to 14d that respectively store developing agents (hereinafter referred to as "toner") of four colors, such as yellow, cyan, magenta, and black. The images that have been visualized and thus become visible are transferred in image transfer regions Ta, Tb, Tc, Td to a belt-like intermediate transfer member, that is to say, an intermediate transfer belt 31, which composes the intermediate transfer unit 30. The intermediate transfer belt 31 moves by rotation around rollers 32, 33, 34 in the direction of arrow B in the figure. The cleaning apparatuses 15a to 15d clean the surfaces of the photosensitive drums 11 at positions downstream from the image transfer regions Ta, Tb, Tc, Td, respectively, by scraping off toner remaining on the photosensitive drums 11a to 11d without getting transferred to the intermediate transfer member. Through the above-described process, images are formed in sequence with use of toner.

A cleaning apparatus 50 for cleaning the image forming surface of the intermediate transfer belt 31 is disposed downstream from a secondary transfer region Te of the intermediate transfer belt 31. The cleaning apparatus 50 includes a cleaning blade 51 for removing toner on the intermediate transfer belt 31, and a collected toner box 52 that stores collected toner. The paper feeding unit 20 includes cassettes 21a, 21b and a manual feed tray 27 for storing sheets P, and pickup rollers 22a, 22b, 26 for sending out the sheets P one by one from the cassettes 21a, 21b or the manual feed tray 27. Furthermore, the paper feeding unit 20 includes paper feeding roller pairs 23 for further conveying the sheets P that have been sent out from the pickup rollers 22a, 22b, 26, respectively, paper feeding guides 24, and registration rollers 25a, 25b for sending out the sheets P to the secondary transfer region Te in accordance with the image forming timings of the respective image forming units.

The fixing unit 40 includes a fixing roller 41a inside which a heat source, such as a halogen heater, is provided, and a pressurizing roller 41b (this roller may also have a heat source) that applies pressure to the fixing roller. In addition, a conveyance guide 43 for directing the sheets P to a nip portion of the pair of the foregoing rollers, inner paper discharge rollers 44 and outer paper discharge rollers 45 for further directing the sheets P discharged from the pair of the foregoing rollers to the outside of the apparatus, and the like are included.

[Printing Operation of Image Forming Apparatus]

A description is now given of a printing operation of the image forming apparatus 1 configured in the above-described manner. The following provides an example in which the sheets P stacked in the cassette 21a are used. When a signal for starting an image forming operation has been issued, first, the pickup roller 22a sends out the sheets P one by one from the cassette 21a. Then, the sheet P is guided by the paper feeding roller pairs 23 through the paper feeding guides 24, and conveyed to the registration rollers 25a, 25b. At this time, the registration rollers 25a, 25b are halted, and the tip of the sheet P hits a nip portion between the registration rollers 25a, 25b. Thereafter, the registration rollers 25a, 25b start rotating in accordance with the timings at which the image forming units 10 start image formation. The timing of this rotation is set so that the sheet P coincides with toner images that have been primary-transferred onto the intermediate transfer belt 31 by the image forming units 10 in the secondary transfer region Te.

Meanwhile, in the image forming units 10, when the signal for starting the image forming operation has been issued, operations are start in sequence through the above-described process, starting from the photosensitive drum 11d that is located most upstream in the direction of rotation of the intermediate transfer belt 31. The charger 35d for primary transfer, to which high voltage has been applied, primary-transfers a toner image formed on the photosensitive drum 11d to the intermediate transfer belt 31 in a primary transfer region Td. The primary-transferred toner image is conveyed to the next primary transfer region Tc. In this region, image formation is performed with a delay corresponding to a period of conveyance of the toner image between image forming units, and the next toner image is transferred onto the previous image using proper registration. From then on, a similar process is repeated; as a result, toner images of four colors are primary-transferred onto the intermediate transfer belt 31.

Thereafter, when the sheet P enters the secondary transfer region Te and comes into contact with the intermediate transfer belt 31, high voltage is applied to the secondary transfer roller 36 in accordance with the timing of passing of the sheet P. In this way, the toner images of four colors that have been formed on the intermediate transfer belt 31 through the above-described process are transferred to the surface of the sheet P. After that, the sheet P is accurately guided by the conveyance guide 43 to a fixing roller nip portion between the fixing roller 41$a$ and the pressurizing roller 41$b$. Then, the toner images are fixed to the surface of the sheet P by heat and nip pressure at this fixing roller nip portion. Subsequently, the sheet P on which the images have been fixed is conveyed by the inner paper discharge rollers 44 and the outer paper discharge rollers 45, and discharged to the outside of the apparatus.

[Configuration for Control of Original Reading Unit]

Figure 2:
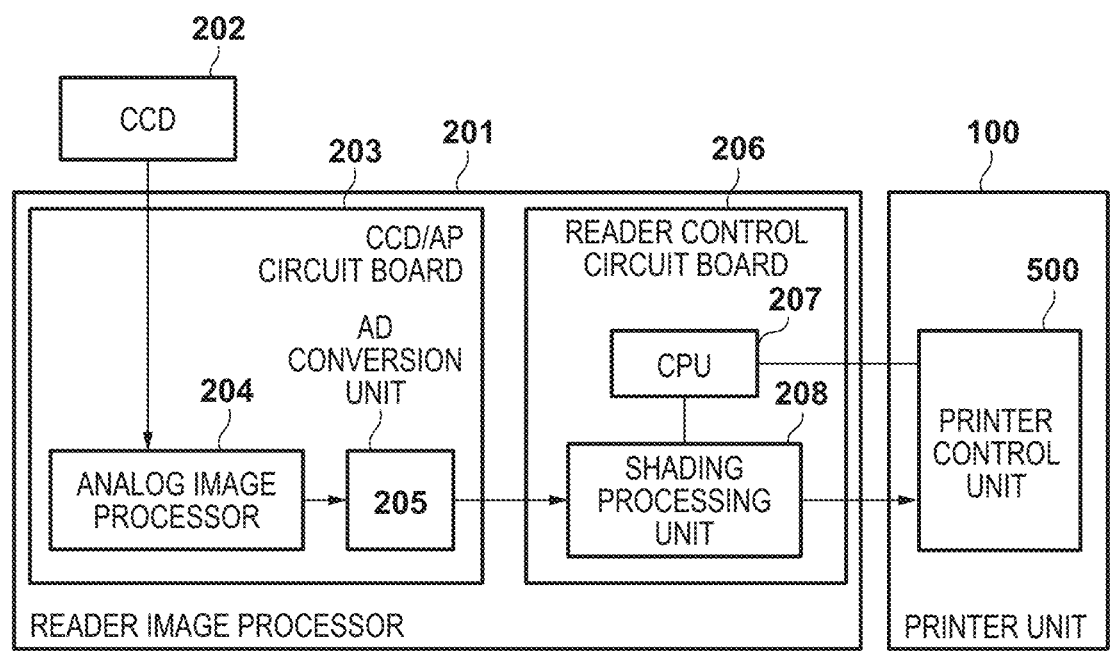
FIG. 2 is a schematic control block diagram of a reader image processor according to the present embodiment.

The following describes a configuration for control of the original reading unit 200 and a signal flow using FIG. 2. The original reading unit 200 is configured to include a reader image processor 201 and a CCD sensor (Charge Coupled Device) 202. An irradiation unit (not shown) irradiates an original to be read with light, and its reflected light forms an image on the CCD (Charge Coupled Device) sensor 202. An analog image processor 204 of a CCD/AP circuit board 203 adjusts the gain and the like of an image signal obtained by the CCD sensor 202, and the resultant image signal is converted into a digital image signal by an AD (Analog-to-Digital) conversion unit 205 and output to a reader control circuit board 206.

A shading processing unit 208 of the reader control circuit board 206 operates in accordance with an instruction signal of a CPU (Central Processing Unit) 207, applies shading correction to the image signal, and outputs the resultant image signal to the printer control unit 500 of the printer unit 100. At this point, the image signal is composed of pieces of luminance information corresponding to RGB (Red, Green, Blue).

Note that to read the original, the original reading unit 200 may be configured as a flatbed scanner that performs reading while the original is placed on a platen, or a sheetfed scanner that performs reading while conveying the original. Furthermore, although the foregoing example has presented a CCD type, a CIS (Contact Image Sensor) type may be used.

[Configuration for Control of Printer Control Unit]

Figure 1:
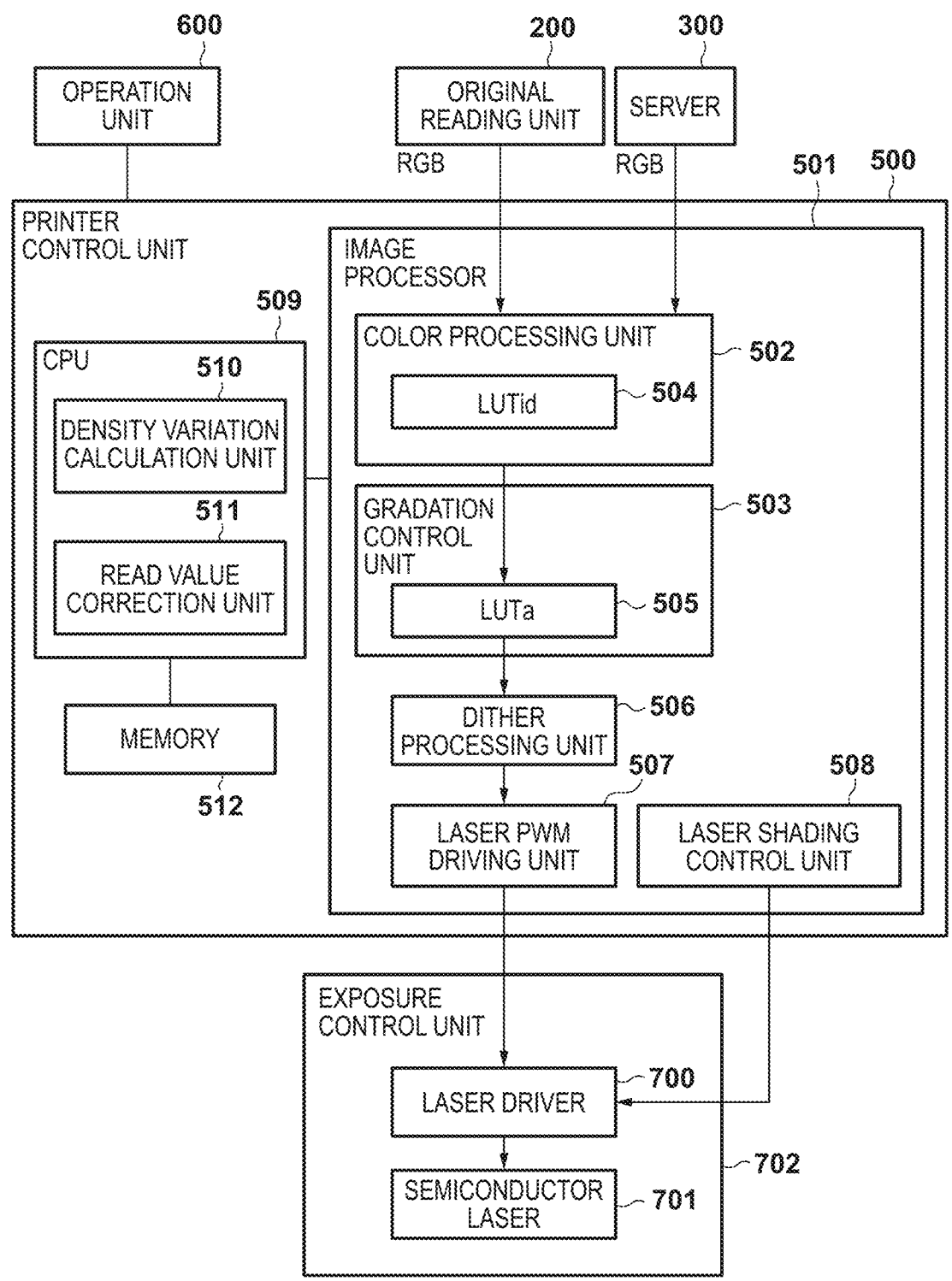
FIG. 1 is a schematic control block diagram of a printer control unit according to the present embodiment.

The following describes a configuration for control of the printer control unit 500, which is included in the printer unit 100, and a signal flow using FIG. 1. Respective components of the printer control unit 500 are integrally controlled by a CPU 509. A memory 512 is a ROM (Read Only Memory) or a RAM (Random Access Memory), and stores a control program and various types of data. An operation unit 600 includes a display apparatus (display) that outputs information to a user, and an input apparatus (input key) for accepting input from the user. For example, the user operates the operation unit 600 to issue an instruction for executing calibration. For example, an operation unit of a touchscreen type included in the image forming apparatus 1 may be used as the operation unit 600.

An image signal processed by the original reading unit 200, a server 300, a host computer, or the like is input to a color processing unit 502 of the printer control unit 500. The color processing unit 502 applies image processing and color processing to the input image signal so that desired output can be obtained when the printer unit 100 has the ideal output characteristics. In the present embodiment, it is assumed that the number of tones of an input signal that has been input as the image signal is 8 bits, and is expanded to 10 bits by the color processing unit 502 to improve accuracy. Thereafter, a tone control unit 503 corrects the tone characteristics of the image signal, and a dither processing unit 506 applies dither processing to the image signal, thereby converting the image signal into a 4-bit signal.

An LUTid 504 included in the color processing unit 502 is a luminance-density conversion table for converting luminance information included in the image signal from the original reading unit 200 into density information. The tone control unit 503 includes a LUTa 505, and corrects the image signal to conform to the characteristics of the printer unit 100. The LUTa 505 is a 10-bit one-dimensional conversion table (tone correction table) for correcting the tone characteristics to the ideal tone characteristics. The LUTa 505 functions as a conversion condition for converting image data. The signal output from the tone control unit 503 undergoes the dither processing in the dither processing unit 506. Furthermore, the signal after the dither processing undergoes pulse-width modulation in a laser PWM (Pulse Width Modulation) driving unit 507. The signal that has been modulated in the laser PWM driving unit 507 is output to an exposure control unit 702.

In the exposure control unit 702, a laser driver 700 causes a semiconductor laser 701 to emit light in accordance with the pulse-modulated signal. For this reason, the dither processing unit 506 performs halftone processing for converting the 10-bit image signal into 4-bit data. A laser shading control unit 508 included in an image processor 501 has a function of performing variable control of the exposure amounts on the photosensitive drums 11 in a laser-scanning direction (hereinafter, main-scanning direction). For regions obtained by dividing an exposure region into thirty-two in the main-scanning direction, the laser shading control unit 508 outputs, to the laser driver 700, a control signal for controlling a laser light amount on a region-by-region basis. The laser driver 700 changes the light amount of the semiconductor laser 701 and causes the light emission in accordance with the control signal from the laser shading control unit 508. The present embodiment uses a configuration in which exposure control units 702 corresponding to four colors are provided independently in correspondence with the four image forming units 10, and there are also multiple laser drivers 700 and semiconductor lasers 701; however, as they have substantially identical control functions, their descriptions are omitted.

A density variation calculation unit 510 and a read value correction unit 511, which are incorporated in a program executed by the CPU 509, are control functions characteristic of the disclosure. Before describing these control functions, a test chart (pattern images) that is formed on a sheet and includes image patterns used in calibration of the present embodiment will be described using FIG. 3.

(Test Chart)

A test chart 800 according to the present embodiment is configured such that, for each toner color, a first image pattern 801 (801Y, 801M, 801C, 801K) and a second image pattern 802 (802Y, 802M, 802C, 802K) are formed in parallel as a pair. The first image pattern 801 is an image that is formed under the same density setting throughout the main-scanning direction; in the present embodiment, it is formed using a density value of approximately 0.5 in an intermediate density range as a target. The second image pattern 802 is an image that is formed by varying a density setting in a stepwise manner in a main-scanning direction; in the present embodiment, it is composed of image patterns corresponding to eight tones, from 0.2 representing low density to 1.6 representing high density, at an interval of 0.2. For each of the colors to which the image forming apparatus 1 corresponds, these first image pattern 801 and second image pattern 802 are formed such that they are aligned in the sub-scanning direction, and the result of such formation is output as the test chart 800.

Figure 3:
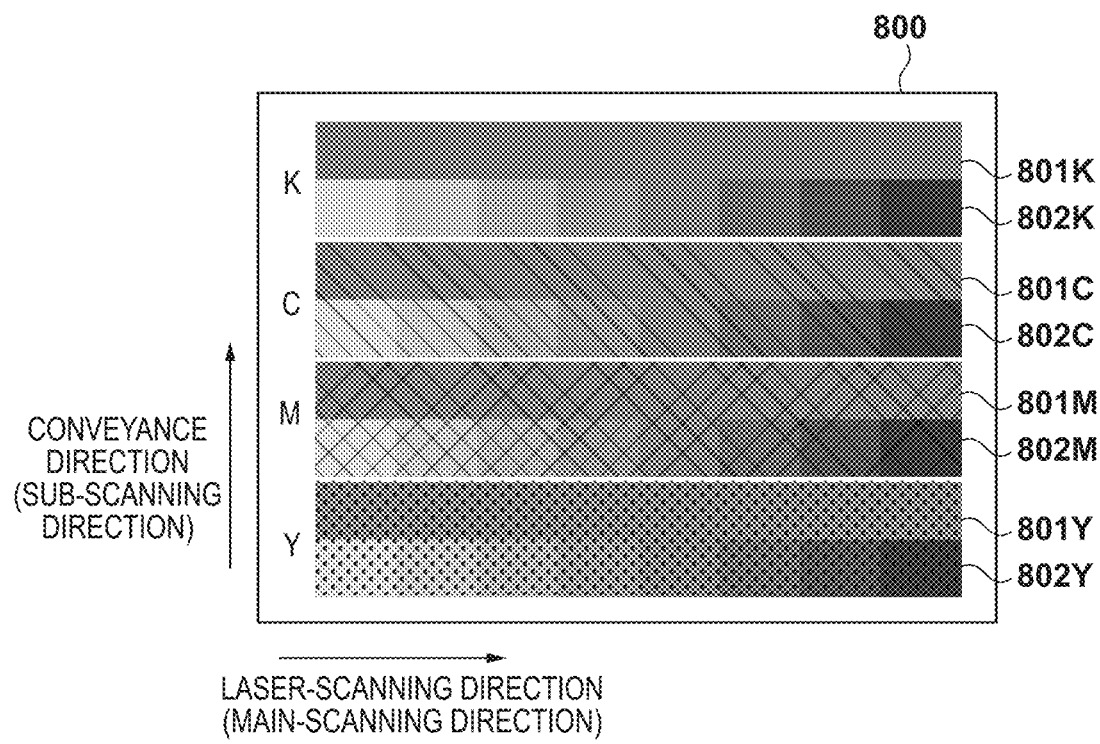
FIG. 3 is a diagram showing examples of image patterns of a test chart for density adjustment according to the present embodiment.

The density value used as the target of the first image pattern 801 and the number of tones and the interval between density values of the second image pattern 802 are not limited to those described above, and other values may be used. For example, the number of tones and the interval between density values may be changed depending on the size of a sheet on which the test chart 800 is formed. Also, the target density of the first image pattern 801 may vary for each color. Furthermore, although FIG. 3 shows an example in which the image patterns are arranged in the order of Y, M, C, K from the upstream side of the conveyance direction, no limitation is intended by this. In addition, no particular restriction is placed on the sizes of the image patterns in the sub-scanning direction (sheet conveyance direction) that is perpendicular to the main-scanning direction. For example, the image patterns may be configured such that they have a fixed size for all colors, or such that they are increased or decreased in size for a specific color(s) in accordance with the characteristics of the original reading unit 200.

In the present embodiment, in reading the output test chart 800 using the original reading unit 200, the test chart 800 is set so that it is scanned in the main-scanning direction. In this way, the same light receiving element of the CCD sensor 202 can read the first image pattern 801 and the second image pattern 802, thereby reducing the influence of sensitivity variation in each light receiving element.

A description is now given of the density variation calculation unit 510 and the read value correction unit 511 of FIG. 1. It is assumed that 100 pieces of sampling data are used in the present embodiment (specifically, 100 pieces at positions in the main-scanning direction, starting from a reference position (e.g., 0), at a predetermined interval), and plots are shown in graphs with partial omission in number. The density variation calculation unit 510 uses data obtained by reading the test chart 800 shown in FIG. 3 using the original reading unit 200 and converting luminance information into density information in the color processing unit 502.

Figure 4A:
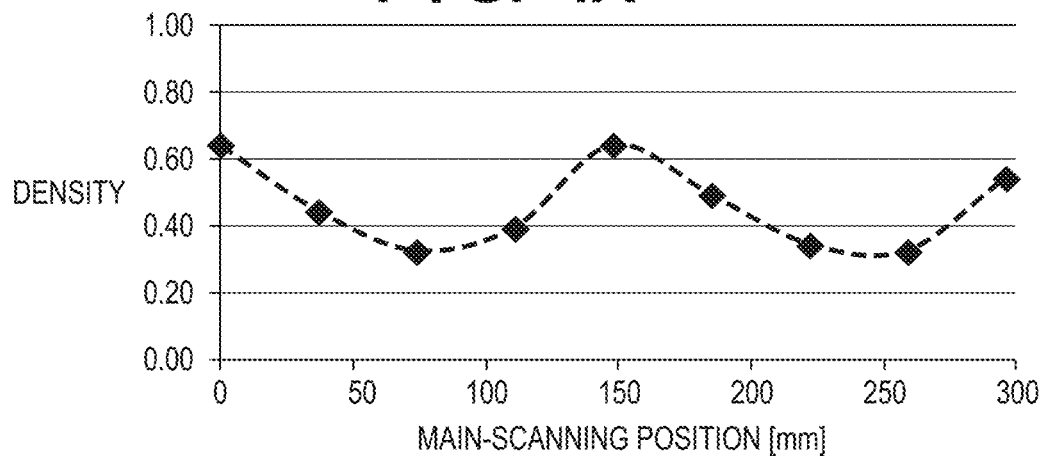
FIGS. 4A, 4B, and 4C are diagrams for describing reading of the image patterns according to the present embodiment.
Figure 4B:
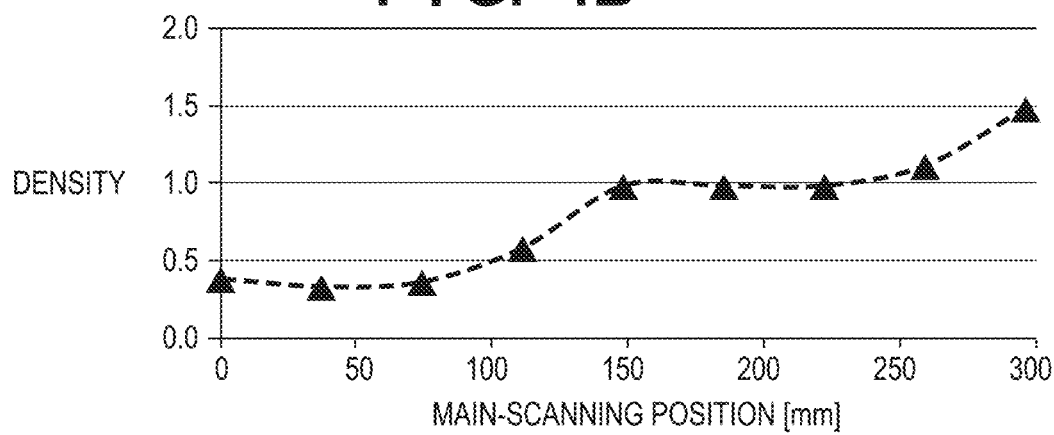
Figure 4C:
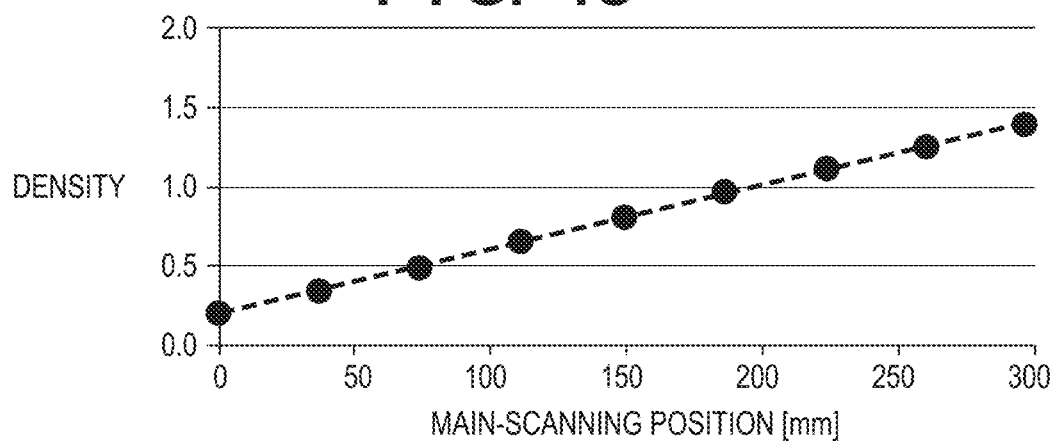

FIGS. 4A to 4C are diagrams for describing the results of reading at the respective main-scanning positions according to the present embodiment, and an example in which correction is performed using these results of reading. In FIGS. 4A to 4C, a horizontal axis indicates main-scanning positions, and a vertical axis indicates density values. It is assumed that the main-scanning positions of FIGS. 4A to 4C correspond to the main-scanning direction of FIG. 3.

FIG. 4A shows an example of data obtained by reading the first image pattern 801 using the original reading unit 200. The variation shown by this graph is greatly influenced by the lens characteristics of the optical systems 13, and for example, manufacturing variation gives rise to individual differences among variation amounts and characteristic curves. Note that ideally, values obtained by reading the first image pattern 801 are density values that are constant at all main-scanning positions, and the graph shows a straight line.

In the present embodiment, the density variation calculation unit 510 first calculates an average value Ave1 from 98 pieces of data among the 100 pieces of data a1 to a100 corresponding to the first image pattern 801, excluding the maximum value Max1 and the minimum value Min1. Then, the density variation calculation unit 510 calculates difference values $\Delta a1$ to $\Delta a100$ by subtracting the average value Ave1 from the pieces of data a1 to a100 that respectively correspond to the main-scanning positions. These difference values represent pieces of density variation data in the main-scanning direction. Here, by excluding the maximum value Max1 and the minimum value Min1, the average value from which transient, unexpected data has been eliminated is used as a reference; thus, the influence of partial image deficiency and reading deficiency is less likely to be exerted. Although one maximum value and one minimum value are excluded in an example presented here, no limitation is intended by this. For example, it is possible to use a configuration in which the average value is calculated by excluding values accounting for a predetermined percentage, or a predetermined number of values, from each of the highest and lowest values.

Next, the read value correction unit 511 will be described. The read value correction unit 511 has a function of correcting pieces of data b1 to b100 corresponding to the second image pattern 802. As shown by a graph of FIG. 4B, pieces of tone data obtained by reading the second image pattern 802 using the original reading unit 200 are in a state where density variation in the main-scanning direction overlaps pieces of data that vary in density tone consecutively from a main-scanning position of 0 mm to a main-scanning position of 300 mm. Ideally, values obtained by reading the second image pattern 802 form a straight line representing a monotonic increase. As the actually measured values have errors as shown in FIG. 4B, the accurate tone characteristics cannot be obtained directly from the actually measured values.

The read value correction unit 511 according to the present embodiment performs computational processing for subtracting, from the read values b1 to b100 of the second image pattern 802, values obtained by multiplying the pieces of density variation data $\Delta a1$ to $\Delta a100$ calculated in the density variation calculation unit 510 by a coefficient $\alpha=0.8$. Although "0.8" is used as the coefficient $\alpha$ here in the present embodiment, the coefficient $\alpha$ is not limited to this value, and it is sufficient to determine an appropriate value as the coefficient $\alpha$ through an advance study in consideration of, for example, characteristic variation in the pieces of density variation data of the image forming apparatus. For example, a value equal to or smaller than 1.0 can be used as the coefficient $\alpha$. Reducing the coefficient $\alpha$ can attenuate the values of the pieces of density variation data and reduce, for example, the influence of variation. Corrected values c1 to c100 that have been obtained in the above-described manner in correspondence with the second image pattern 802 represent pieces of tone data from which the overlapping density variation components have been removed. Then, averaging and plotting are performed for each area of the same tone, resulting in a graph shown by FIG. 4C. The corrected pieces of data approximate the ideal straight line representing the monotonic increase.

Furthermore, if the main-scanning density variation exceeds a predetermined allowable value due to, for example, some kind of abnormality in a component, there is a risk that the read values b1 to b100 of the second image pattern 802 may reach a signal saturation region and the accuracy of the read values may be impaired. In view of this, in the present embodiment, the CPU 509 has a function of calculating Max2, Min2 from the read values b1 to b100 of the second image pattern 802, and checking whether these pieces of data have reached a saturation region of a 10-bit data width. Here, Max2 denotes the maximum value among the read values b1 to b100 of the second image pattern 802, and Min2 denotes the minimum value among the read values b1 to b100 of the second image pattern 802. In the present embodiment, when Max2 calculated based on a decimal system is smaller than 1023 and Min2 is a value larger than 0, it is determined that the pieces of data are not saturated, and the above-described computational processing of the read value correction unit 511 is executed.

On the other hand, when it is determined that the pieces of data are saturated, control is performed so as not to correct the pieces of tone data. In this case, for example, the operation unit 600 displays a suggestion to execute calibration again in a state where the main-scanning exposure amounts have been corrected by the laser shading control unit 508 based on the pieces of main-scanning density variation data (the results of reading of the first image pattern 801 shown in FIG. 4A). In this way, the second image pattern 802 can be read in a state where the main-scanning density variation has been reduced using control values for the corrected main-scanning exposure amounts. As a result, the density variation is further reduced, and the pieces of tone data can be corrected as well.

The foregoing processing is performed on a color-by-color basis with respect to the colors (toner) to which the image forming apparatus 1 corresponds. Therefore, with an increase or decrease in the number of colors, the number of times calibration processing is performed also increases or decreases.

[Operational Flow of Density Adjustment Mode]

Figure 6:
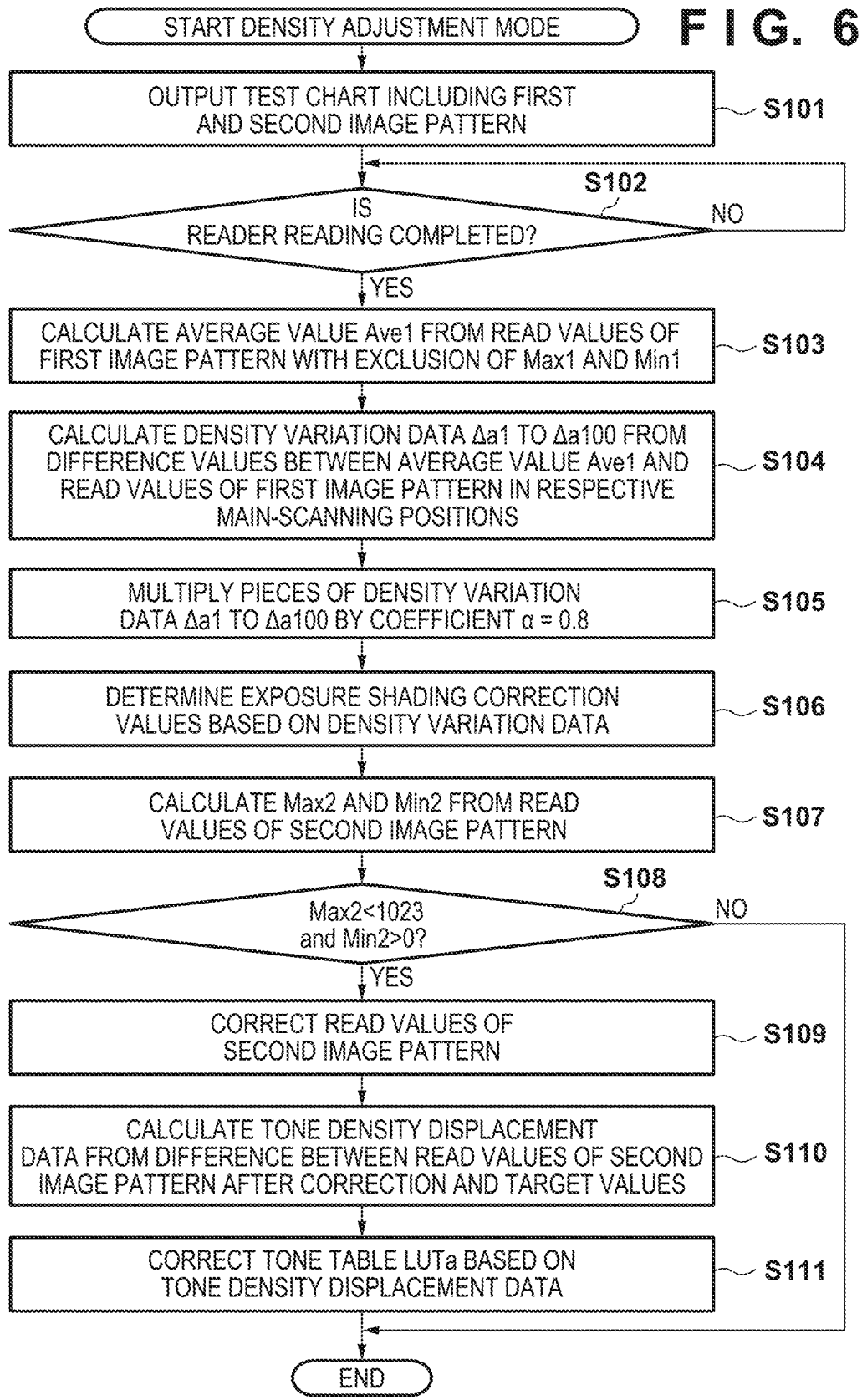
FIG. 6 is an operational flowchart in a density adjustment mode according to the present embodiment.

A description is now given of an operational flow of a density adjustment mode according to the present embodiment using FIG. 6. The present processing flow is realized by the CPU 509 operating as the density variation calculation unit 510 and the read value correction unit 511 in coordination with the memory 512, the respective image forming units, and the like. In the present processing flow, the execution of the density adjustment mode is caused by a user's operation on an operation panel (not shown) of the operation unit 600.

In step S101, the image forming apparatus 1 forms and outputs the test chart 800, which is configured to include the pair of the first image pattern 801 and the second image pattern 802 as described earlier using FIG. 3. It is assumed that image data of the test chart 800 here is held by the image forming apparatus 1 in advance. Furthermore, although it is assumed that the size of the test chart 800 is such that the test chart 800 is formed on, for example, a single sheet of paper of an A4 or LTR size, the size may be changed in accordance with the size and functions of the image forming apparatus 1. In addition, the image forming apparatus 1 displays, on the operation unit 600, guidance for suggesting the user to set the output test chart 800 on the original reading unit 200 and press a reading start button. The image forming apparatus 1 stands by until it accepts the foregoing operation by the user.

In step S102, the image forming apparatus 1 stands by until the original reading unit 200 completes an operation of reading the test chart 800. If the reading is completed (YES of step S102), the processing proceeds to step S103.

In step S103, the density variation calculation unit 510 calculates the average value Ave1 from the read values a1 to a100 of the first image pattern 801, with the exclusion of the maximum value Max1 and the minimum value Min1 included among the read values.

In step S104, the density variation calculation unit 510 calculates the difference values $\Delta a1$ to $\Delta a100$ corresponding to the respective main-scanning positions by subtracting the average value Ave1 calculated in step S103 from each of the read values a1 to a100 corresponding to the respective main-scanning positions. These difference values are used as pieces of density variation data that represent main-scanning density variation.

In step S105, the read value correction unit 511 carries out computational processing for multiplying the pieces of density variation data $\Delta a1$ to $\Delta a100$ by the coefficient $\alpha=0.8$.

In step S106, the read value correction unit 511 determines correction values for exposure shading from the pieces of density variation data after the multiplication by the coefficient. The read value correction unit 511 stores the determined correction values into the memory 512.

In step S107, the read value correction unit 511 calculates Max2 and Min2 from the read values b1 to b100 of the second image pattern 802. As stated earlier, Max2 and Min2 respectively denote the maximum value and the minimum value among the read values b1 to b100 of the second image pattern 802.

In step S108, the read value correction unit 511 determines whether Max2 and Min2 have reached a saturation level. As stated earlier, in the present embodiment, a saturation level threshold for Max2 is 1023, and a saturation level threshold for Min2 is 0. If the read values b1 to b100 are in this range, that is to say, the relationships 1023>Max2 and Min2>0 are satisfied, it is determined that the read values fall in a desired range and are not saturated. If it is determined that Max2 and Min2 are in the desired range (YES of step S108), the processing proceeds to step S109. If it is determined that they are outside the desired range (NO of step S108), the present processing flow is ended.

In step S109, the read value correction unit 511 performs correction by subtracting, from the respective read values b1 to b100 of the second image pattern 802, the pieces of density variation data $\Delta a1$ to $\Delta a100$ at the corresponding main-scanning positions, which have been calculated in step S105 through the multiplication by the coefficient. As a result, the corrected values c1 to c100 corresponding to the second image pattern 802 are obtained. These values c1 to c100 correspond to the values of FIG. 4C.

In step S110, the read value correction unit 511 calculates tone density displacements by comparing the values c1 to c100 of the second image pattern 802, which have been obtained through the correction in step S109, with tone density reference values.

In step S111, the read value correction unit 511 corrects the tone correction table LUTa 505 included in the tone control unit 503 based on the results of calculation in step S110. Then, the corrected LUTa 505 is stored into memory 512. Thereafter, the image forming apparatus 1 displays the completion of the density adjustment mode on the operation unit 600, and ends the present processing flow.

From then on, the image processor 501 performs image formation using the result of the foregoing calibration (density adjustment); in this way, the image quality can be maintained and improved.

As described above, according to the disclosure, stability can be improved when reading uneven image density. Furthermore, as the density adjustment can be made using the test chart formed on a single sheet of paper, it is possible to reduce the number of sheets of the test chart used in correction of the uneven image density and the tone characteristics, and shorten an adjustment period.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-229206, filed on Dec. 6, 2018, which is hereby incorporated by reference herein in its entirety.

What is claimed is:

1. An image forming apparatus, comprising:
a conversion unit configured to convert image data based on a conversion condition;
a first image forming unit configured to form an image of a first color on a first photosensitive member based on the converted image data;
a second image forming unit configured to form an image of a second color on a second photosensitive member based on the converted image data;
a conveyance unit configured to convey a sheet;
a transfer unit configured to transfer the image of the first color on the first photosensitive member and the image of the second color on the second photosensitive member to the sheet; and
a controller configured to:
control the first image forming unit and the second image forming unit to form a plurality of pattern images, wherein the plurality of pattern images includes a first pattern image formed by the first image forming unit, a second pattern image formed by the second image forming unit, a plurality of third pattern images that are formed by the first image forming unit and have different tones from one another, and a plurality of fourth pattern images that are formed by the second image forming unit and have different tones from one another;
control the transfer unit to transfer the plurality of pattern images to the sheet;
obtain data that has been output from a sensor and is related to the plurality of pattern images; and
generate the conversion condition based on the data,
wherein the first pattern image extends in a predetermined direction on the sheet, the predetermined direction being perpendicular to a conveyance direction in which the conveyance unit conveys the sheet,
wherein the second pattern image extends in the predetermined direction on the sheet,
wherein the plurality of third pattern images are aligned in the predetermined direction on the sheet, and
wherein the plurality of fourth pattern images are aligned in the predetermined direction on the sheet.

2. The image forming apparatus according to claim 1, wherein
the conversion condition includes a first conversion condition for the first image forming unit and a second conversion condition for the second image forming unit.

3. The image forming apparatus according to claim 1, wherein
the conversion condition includes a first conversion condition for the first image forming unit and a second conversion condition for the second image forming unit,
the controller generates the first conversion condition based on data related to the first pattern image and data related to the plurality of third pattern images, and
the controller generates the second conversion condition based on data related to the second pattern image and data related to the plurality of fourth pattern images.

4. The image forming apparatus according to claim 1, wherein
the conversion condition includes a first conversion condition for the first image forming unit and a second conversion condition for the second image forming unit,
the controller converts data related to the plurality of third pattern images based on data related to the first pattern image, and generates the first conversion condition based on the converted data related to the plurality of third pattern images, and
the controller converts data related to the plurality of fourth pattern images based on data related to the second pattern image, and generates the second conversion condition based on the converted data related to the plurality of fourth pattern images.

5. The image forming apparatus according to claim 1, wherein
the controller obtains data related to different positions on the first pattern image in the predetermined direction as data related to the first pattern image, and the controller obtains data related to different positions on the second pattern image in the predetermined direction as data related to the second pattern image.

6. The image forming apparatus according to claim 1, wherein
the controller obtains data related to densities at different positions on the first pattern image in the predetermined direction as data related to the first pattern image, and
the controller obtains data related to densities at different positions on the second pattern image in the predetermined direction as data related to the second pattern image.

7. The image forming apparatus according to claim 6, wherein
the conversion condition includes a first conversion condition for the first image forming unit and a second conversion condition for the second image forming unit,
the controller converts data related to the plurality of third pattern images based on the data related to the densities at the different positions on the first pattern image, without using data of a highest density of the first pattern image and data of a lowest density of the first pattern image, and generates the first conversion condition based on the converted data related to the plurality of third pattern images, and
the controller converts data related to the plurality of fourth pattern images based on the data related to the densities at the different positions on the second pattern image, without using data of a highest density of the second pattern image and data of a lowest density of the second pattern image, and generates the second conversion condition based on the converted data related to the plurality of fourth pattern images.

8. The image forming apparatus according to claim 1, further comprising
a display,
wherein when a predetermined condition related to densities of the plurality of third pattern images is not satisfied, the controller displays, on the display, a screen for suggesting re-formation of the plurality of pattern images.

9. The image forming apparatus according to claim 1, further comprising
a display,
wherein when a predetermined condition related to densities of the plurality of third pattern images is not satisfied, the controller displays, on the display, a screen for suggesting formation of another plurality of third pattern images, and
wherein in forming the plurality of third pattern images, an image forming condition of the first image forming unit is controlled based on data related to the first pattern image.

10. The image forming apparatus according to claim 9, wherein
the first image forming unit includes the first photosensitive member, a first exposure unit that exposes the first photosensitive member to light to form an electrostatic latent image, and a first developing unit that develops the electrostatic latent image on the first photosensitive member, and
the image forming condition includes an exposure amount of the first exposure unit.

11. The image forming apparatus according to claim 1, wherein
the conversion condition includes a tone correction condition for correcting tone characteristics of an image formed on the sheet.

* * * * *